(12) United States Patent
Konstantinovskiy (10) Patent No.: US 7,950,341 B2
(45) Date of Patent: May 31, 2011

(54) SHIP WITH A SPECIAL LOWER LEVEL

(76) Inventor: Alexandr Konstantinovskiy, Kimry (RU)

( * ) Notice: Subject to any disclaimer, the term of this patent is extended or adjusted under 35 U.S.C. 154(b) by 0 days.

(21) Appl. No.: 12/238,429

(22) Filed: Sep. 25, 2008

(65) Prior Publication Data

US 2010/0071607 A1 Mar. 25, 2010

(51) Int. Cl.
*B63B 1/32* (2006.01)
(52) U.S. Cl. .............. 114/289; 114/65 R; 114/162
(58) Field of Classification Search ............ 114/65 R, 114/288, 289, 290, 67 A, 162, 163
See application file for complete search history.

(56) References Cited

U.S. PATENT DOCUMENTS

| | | | | |
|---|---|---|---|---|
| 1,831,697 | A * | 11/1931 | Ziegler | 114/67 A |
| 3,382,833 | A * | 5/1968 | Wukowitz | 114/289 |
| 3,991,698 | A * | 11/1976 | Simpson | 114/288 |
| 6,032,602 | A | 3/2000 | Ehluss et al. | |

FOREIGN PATENT DOCUMENTS

JP 05338587 A * 12/1993 .................... 114/290

OTHER PUBLICATIONS

Anti-Rolling Stabilizers, http://www.michelangelo-raffaello.com/english_site/designing/tech_pag1/technic1.htm, Printed from the Internet Nov. 17, 2008, 3 pages.

* cited by examiner

*Primary Examiner* — Lars A Olson
(74) *Attorney, Agent, or Firm* — Alexey Bakman, Esq (57) ABSTRACT

The ship body of the present invention comprises at least two levels. One is an upper level that comprises a floatable body. The other is a lower level. The lower level is intended to be submerged under water in normal use. The lower level comprises at least two parallel, essentially vertical walls, a floor, and a ceiling connecting the at least two parallel essentially vertical walls. The front end and a rear end of the lower level are open to allow water to enter through the front end and exit through the rear end of the lower level.

8 Claims, 5 Drawing Sheets

SHIP WITH A SPECIAL LOWER LEVEL

FIELD OF THE INVENTION

The field of the present invention is ships and particularly a ship with a new type of hull, comprising a special lower level that provides stability and improves other characteristics of the ship.

BACKGROUND OF THE INVENTION

The shape of most modern ship hulls follows a long line of tradition, dating back hundreds if not thousands of years. As shipbuilding progressed from dugout canoes to triremes, to caravels, to ironclads, to modern hundred-thousand-ton cruise ships, many things changed. The size, modes of propulsion and construction materials have evolved, yet the same plow-shaped hull remains on the vast majority of today's displacement-type vessels. This is particularly true of the larger heavier boats plowing the oceans today, such as commercial transport ships, cruise ships and aircraft carriers.

While many glider-type hull designs have been developed in recent decades, few of them are practically adaptable to heavier ships. The ships that would most benefit from improvements in safety, comfort, stability, structural rigidity, maneuverability and fuel economy continue to rely on inefficient hulls of centuries-old design.

One major deficiency of the plow-bow-shaped hull is the lack of stability. Tremendous structures of modern vessels tower over the water, perched on thin narrow waterlines. Under the water, huge keels are often required to balance out and provide some lateral (side-to-side) stability to the ship. The keels often extend to great depth, preventing ships from operating in most of the world's ports, unless such ports are specifically adapted for modern ocean liners. Long keels greatly increase the risk of ships running aground, and the risk of underwater collisions with submarines and mines (in areas of past or present military conflicts). Ship keels are a great source of injury to large marine animals.

To effectively counter-balance the above-the-water structures of a vessel and prevent capsizing, the keels must be filled with ballast or otherwise made heavy. The keels are usually large in order to take advantage of water resistance in minimizing lateral roll. Large and heavy keels required for today's ships produce powerful frontal resistance and friction against water, reducing speed and increasing the power consumption. With record and rising fuel prices and the predicted reduction of global oil output in the next several decades, fuel-hungry vessels of today are a source of great concern to the shipping companies and to the expanding, interconnected global economy, where most products in intercontinental trade are shipped in heavy displacement-type merchant vessels. Increased costs of shipping, caused by inefficient shipping vessels, translate to increased costs of imports, reduced exports and overall strain for the global economy.

The keels help little with the bow-to-stern pitch. It is not unusual to observe the dramatic images of bows of medium and large navy cruisers dipping under the waves and flying up, splashing tons of water in choppy seas or at high speeds. Continued stress on the hull, resulting from the pitch also leads to reduced service life and increased maintenance costs of the vessels.

Lateral rolling and pitch on high seas was always accepted as an intrinsic part of seafaring. Even today, with cruise ships doubling in size every decade or so, many people suffer from sea sickness on cruise vacations. For this reason alone, tens of millions of people avoid cruise vacations. If cruise companies could offer their services on vessels that were practically free of roll and pitch, their incomes, and the popularity of this type of vacations would greatly increase.

Similarly, the roll and pitch on military ships, such as aircraft carriers, or cruise missle-launching ships may complicate takeoff and landing of aircraft, or launching of missiles in rough seas. On commercial transports, the roll and pitch may lead to the spoilage of produce. Movement causes products, such as fruits to move and rub against one another, leading to spoilage. One apple in a cargo of hundreds of boxes may become spoiled and release juices. Rocking motion of the ship will distribute the juices from the spoiled apple to other apples in the barrel, or other boxes, which too will become rotten. Similarly, with transport of any liquid medium, staking and movement of the medium will redistribute bacteria and oxygen throughout the container, thus accelerating deterioration and spoilage.

Of course, roll and pitch increases the risk of movement of cargo within the holds of the ship and the risk of ultimate capsizing of the ship. Uneven loading, overloading, sharp turns, can all lead to disasters on the ships with traditional plow-shaped hulls. Stories of overturned ferries, with hundreds of lives lost, are frequent in the news. Unlike the dugout canoes modern ships are not made out of floatable materials. So, not only capsizing, but any breach in the thin shell separating the interior of the ship from the ocean can cause a catastrophe. A collision, or a strike of a reef or an iceberg against the buttom of a ship is often sufficient to send thousands of people to a watery grave.

In the best case, the propellers extending from under the ship's bottom will take the brunt of the collision. But this will render the ship immobile. Propellers—the vital element of ship's mobility are open and vulnerable to damage from collision and/or entwinement with ropes, seaweed and other debris.

Therefore, there is a long-standing and unfulfilled need in the art for a new type of ship, with a new type of vessel hull. This new hull should provide improved speed and fuel efficiency. It should improve ship's stability, preventing capsizings of boats from overload and improper distribution of weight. It should reduce roll and pitch experienced by cargo and passengers on high seas. The new hull should protect the propellers from damage and entwinement with ropes and seaweed. It should provide a rigid frame for reducing the stress experienced by vessel's body. It should also protect the ship from punctures in the event of underwater collisions or ship running aground. The present invention achieves these objectives and provides numerous other benefits.

SUMMARY OF THE PRESENT INVENTION

The present invention is defined by the following claims and nothing in this section should be taken as a limitation on those claims.

The invention describes and claims a ship body, that comprises at least two levels. One is an upper level that comprises a floatable body. The other is a lower level. The lower level is intended to be submerged under water in normal use. The lower level comprises at least two parallel, essentially vertical walls, a floor, and a ceiling connecting the at least two parallel essentially vertical walls. The front end and a rear end of the lower level are open to allow water to enter through the front end of the lower level and exit through the rear end of the lower level. The lower level further comprises a tunnel. The tunnel extends longitudinally inside of the lower level, extending from the front end to the rear end.

The lower level further comprises at least one bulkhead inside of the tunnel. The bulkhead extends vertically or essentially vertically from the floor to the ceiling. It also extends longitudinally (horizontally, lengthwise) inside the tunnel for at least half the length of the tunnel, thus dividing the tunnel into at least two parallel subsections. Preferably, there is more than one bulkhead, dividing the tunnel into more than two parallel subsections. It is also desirable that the tunnel and each individual subsection has the same consistent cross-sectional diameter throughout its entire length.

Preferred embodiments of the ship further comprise at least one propeller. The propeller is positioned inside of the tunnel, so that the water that is fed to the propeller comes from the tunnel. This in turn reduces the pressure in the tunnel and improves ship's performance.

In order to improve maneuverability and efficiency, the ship preferably further comprises one or more front rudders. The rudders are positioned in the bow end of the ship body. The description and the claims also refer to the embodiments of the ship comprising a plurality of water outlets, as well as the the embodiments comprising a plurality of raised longitudinally-extending bands and a gas pump. The gas pump is intended for pumping the bubbles of gas into spaces between the adjacent bands of the plurality of raised bands, and thus reducing the friction of the ship.

The method of stabilizing a vessel hull by attaching the lower level to the bottom of a vessel hull is also described and claimed.

DETAILED DESCRIPTION OF THE PREFERRED EMBODIMENTS

The method of the present invention will now be illustrated by reference to the accompanying drawings.

Preferred embodiments of the new ship body of the present invention have been assigned reference numeral 10. Other elements have been assigned the reference numerals referred to below.

The ship body 10, also referred to as ship 10 and vessel 10 is directed to the new type of ship body that has at least two levels. As most ship bodies, ship 10 comprises a bow end 12, a stern end 14, a right side 16, and a left side 18, all marked for ease of reference on FIG. 1. The bow end 12 refers to the front section of the ship, the stern end 14, to the rear section of the ship, and the right side 16, and the left side 18, to the right and left side of the ship (not the drawing), respectively.

The ship 10 further comprises a lower level 20 and an upper level 22. The lower level 20 is one of the key elements of the design of the new vessel. It is the element that allows for improved stability, safety, and economy of the vessel 10. The lower level 20 comprises at least two parallel, (vertical or essentially vertical) walls 24. The walls 24 are comprised of a left wall 26 and a right wall 28. These walls 24 are the external side walls of the lower level 20 and extend for most of the length of the lower level 20. In the preferred embodiment shown in FIG. 1, the walls 24 are vertical. The term "essentially vertical" refers to the fact that in some embodiments, the walls 24 are slanted at an angle to the vertical, are concave, convex, or have some other curvature. Thus, for example, the left wall 26 maybe slanted 40 degrees to the left from the vertical axis, and the right wall 28 may be slanted 40 degrees to the right from the vertical axis, to create a portion of the hull that expands as it rises.

Figure 2:
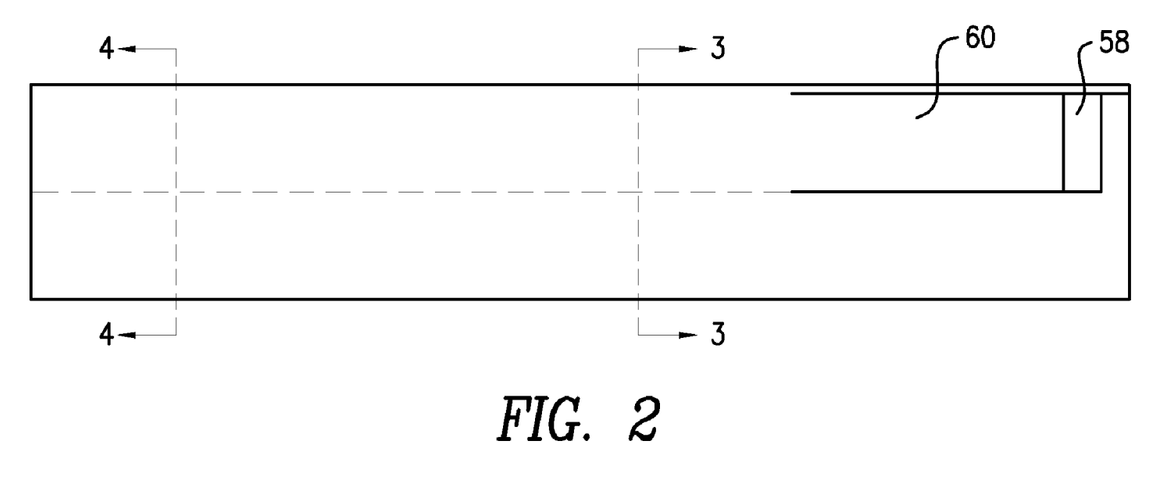
FIG. 2 is a right-side view of the preferred embodiment of FIG. 1.

The lower level further comprises a floor 30. The floor extends from the left wall 26 to the right wall 28, connecting the walls 24 with each other. Similarly, the lower level comprises a ceiling 32, connecting the walls 24 with each other at a point above that where they are connected by the floor. In a sense, in the preferred embodiments, the walls 24, the floor 30, and the ceiling 32 form the lower level 20 in the form of a box-like structure (See FIG. 6). This box-like structure (the level 20) has a front end 34 and a rear end 36 (See FIG. 2). The front end of the level 20 is open to allow water to enter through the front end 34. The water, entering through the front end 34 exits through the rear end 36. In other words, the water channels through a tunnel 38, created by (and between) the walls 24, the floor 30, and the ceiling 32. The tunnel 38 extends longitudinally inside of the lower level 20, extending from the front end 34 to the rear end 36.

The lower level 20 is intended to be submerged under water in normal use of the ship 10. Tons of water, occupying the tunnel 38 at any given time, provide a powerful stabilizing force, preventing or minimizing roll and pitch of the ship 10. The open/non-hermetical lower level 20 also provides a layer of rigidity to the ship 10 and protection to the upper level 22.

The upper level 22 comprises a floatable body 40, otherwise referred to as the float 40. The presence of the float 40 makes the upper level 22 a floatation level. With lower level 20 fully submerged under water, the upper level 22 preferably provides floatability to the lower level 20 and the rest of the ship 10. In the preferred embodiments, the upper level 22 is partially submerged, in a way similar to a more traditional hull.

It should be noted that the terms "lower level" and "upper level," as used in this description and the claims are intended to convey the relative position of the levels in relation to one another. Thus, the lower level 20 is positioned below the upper level 22. But level 20 is preferably, but not necessarily, the lowest level of the ship and the upper level 22 is not necessarily the highest level of the ship. In some, but not all of the preferred embodiments, the lower level 20 is the lowest level of the ship 10 and the upper level 22 is the highest level of the ship 10. For the sake of simplicity, the preferred embodiments in FIGS. 1-6 show the preferred embodiments with only two layers. However, in other embodiments there are levels and structures below the lower level 20 and/or above the upper level 22. In fact, in some preferred embodiments (such as cruise ship embodiments), there are several layers of decks above the upper level 22. In some alternative embodiments anticipated by the present invention, there are intermediate levels between the lower level 20 and the upper level 22.

In the preferred embodiments of the ship body 10, the lower level 20 further comprises at least one bulkhead 42, and preferably, a plurality of bulkheads 42 inside of the tunnel 38. The bulkhead (or bulkheads) 42 extend vertically from the floor to the ceiling of the tunnel 38 of the lower level 20. Again, the term "vertically" here refers to "essentially vertically." That is, some curvatures or sloping may be present. They also extend longitudinally inside the tunnel 38 for at least half the length of the tunnel 38, thus dividing the tunnel 38 into at least two parallel subsections 44. In other words, bulkhead or bulkheads 42 are vertical or slanted vertical walls that are horizontally (i.e. along the length of the ship 10) parallel to the walls 24. Bulkheads 42 subdivide the tunnel 38 into smaller parallel tunnels (subsections 44). In the preferred embodiment shown in FIG. 1, these subsections 44 are of equal cross-sectional diameter. However, in other embodiments, the cross-sectional diameter of different subsections 44 on the same ship may vary. For example, subsections 44 comprising the propellers may be wider than other subsections 44. Bulkheads 42 provide additional stability to the ship by preventing excessive rolling of water in the tunnel, if a storm lifts a portion of the lower level 20 out of the water. They also provide (in addition to other benefits) additional rigidity to the vessel 10, as well as, improved water channeling to propellers, as discussed below. The number of bulkheads 42 varies, depending on the size of the ship and engine configuration, with preferred embodiment shown on FIG. 6 having three bulkheads.

In the preferred embodiments of the ship 10, the ship 10 comprises at least one, and preferably several propellers 46. The propellers 46 are positioned inside of the tunnel 38. In the, preferred embodiments such as the embodiment of FIG. 4 where there are several propellers and one or more bulkheads, each propeller 46 is positioned in a separate subsection 44. Such positioning of propellers 46, separated from each other by bulkheads 42, reduces the interference of multiple propellers with each other. Furthermore, since the propellers 46 are shielded from the environment above, below, and to their sides by the tunnel 38, the chances of the propeller being damaged by underwater collision, debris, or becoming tangled in ropes or seaweed are reduced. This improves vessel's reliability. The noise, particularly the underwater noise produced by the vessel 10 is also reduced by the shielding of propellers 46 by the tunnel 38. The reduction in noise, so produced, has beneficial effects on wildlife, passenger's comfort, and, in case of military vessels, better concealment from detection by listening devices. Protected propellers would also reduce the risk of injury to whales and other marine life, as well as to passengers who happen to fall overboard.

Figure 4:
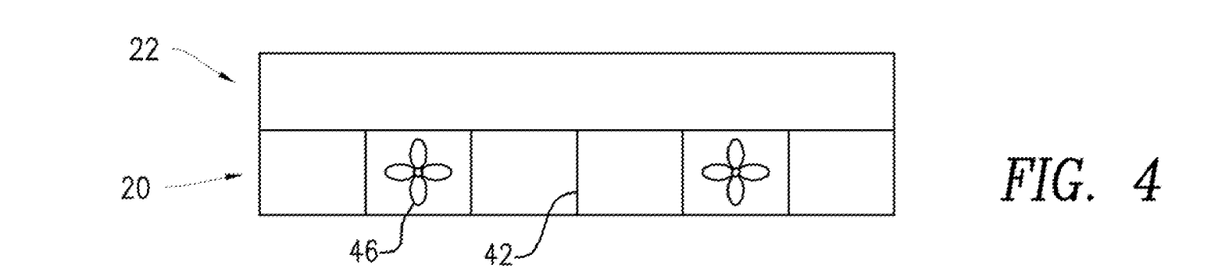
FIG. 4 is a transverse section taken on line 4-4 of the ship of FIG. 2, showing the propellers positioned inside of the tunnel.
Figure 5:
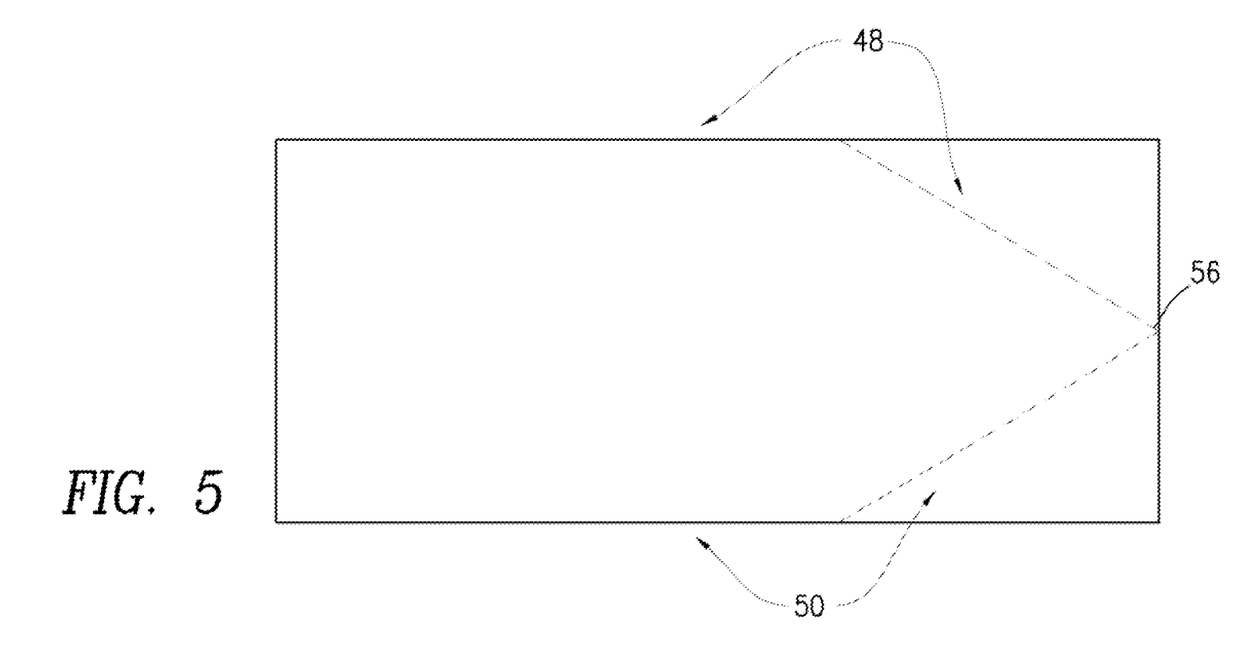
FIG. 5 is a view from above of one of the preferred embodiments, illustrating the convergence of the left side of the upper level and the right side of the upper level to form an edge-shaped bow.

Positioning of propellers 46 inside of the tunnel 38 sets up the situation, where the propellers are forced to take up and push only against the water that is coming down the tunnel 38 or one of its subsections 44. This accelerates the flow of water in the tunnel 38, and, therefore, reduces the pressure inside of the tunnel. The reduction of pressure in the tunnel 38 in turn has a positive effect on speed and fuel efficiency, among other benefits.

Figure 1:
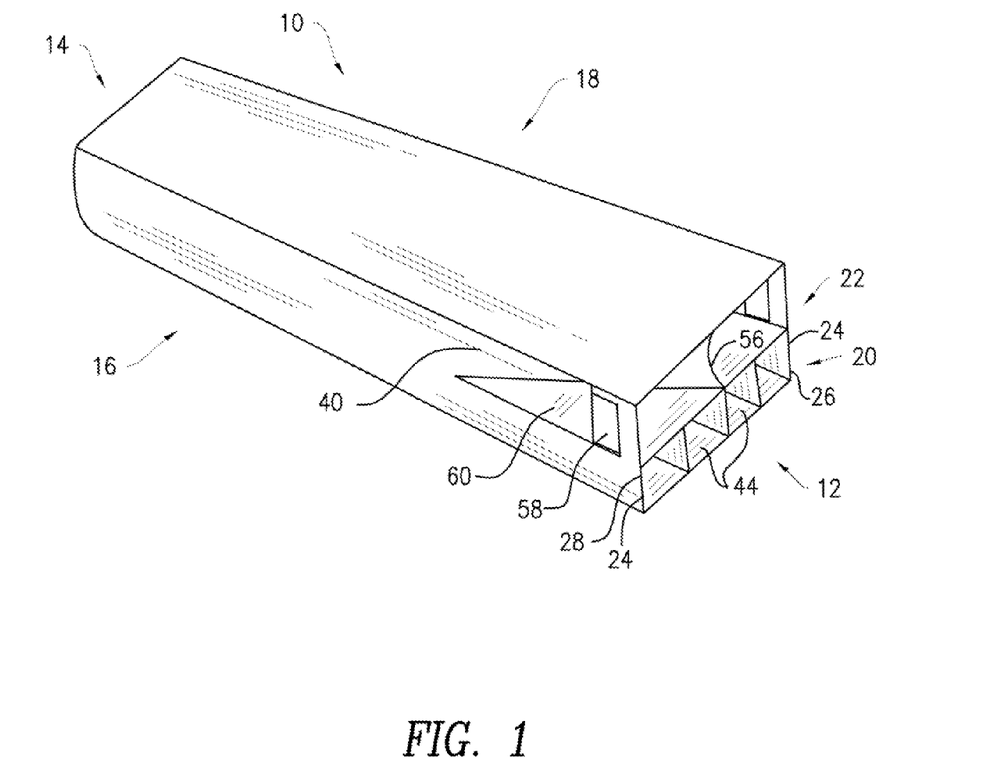
FIG. 1 illustrates a perspective view of the preferred embodiment of the ship of the present invention.
Figure 6:
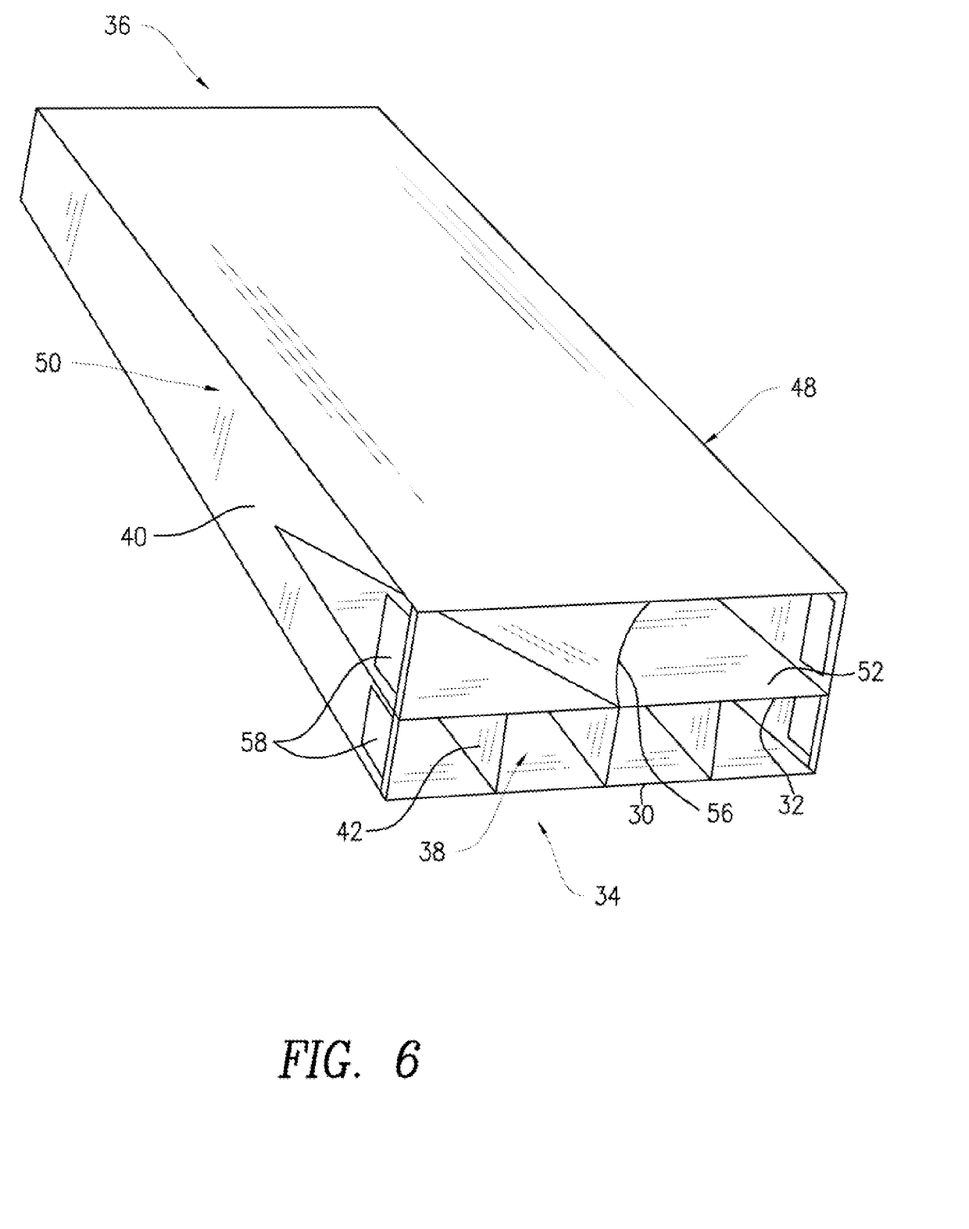
FIG. 6 is a perspective view of another preferred embodiment of the ship of the present invention, illustrating front rudders in the upper level and in the lower level.

In order to optimize drag, and ensure smooth flow of water through the tunnel 38, it is preferable that the tunnel 38 be straight and have the same consistent cross-sectional diameter (or the same height and width) throughout its length. If the tunnel 38 is subdivided into several parallel subsections 44, it is also preferable that each individual subsection 44 be of the same consistent diameter throughout its length. The cross-sections of the tunnel 38 and subsections 44, as shown on the preferred embodiments on FIG. 1 and FIG. 6, are rectangular. However, in other embodiments, the shape may be different. For example, in some embodiments, the entire tunnel 38 and/or individual subsections 22 may have a circular cross-section, or the bulkheads 42 may be positioned at 45 degree angles to the vertical, thus creating the subsections 44 of triangular cross-sectional shape.

In the preferred embodiments of the invention, the upper level comprises a left side 48 of the upper level, a right side 50 of the upper level, and a bottom 52 of the upper level (See FIG. 6). The ceiling 32 of the lower level forms the bottom 52 of the upper level 22. In other words, in the preferred embodiments, such as the one shown on FIG. 6, where the upper level 22 is directly above the lower level 20, a single layer, separating the levels serves as the ceiling 32 and the bottom 52 of the upper level 22.

Figure 7:
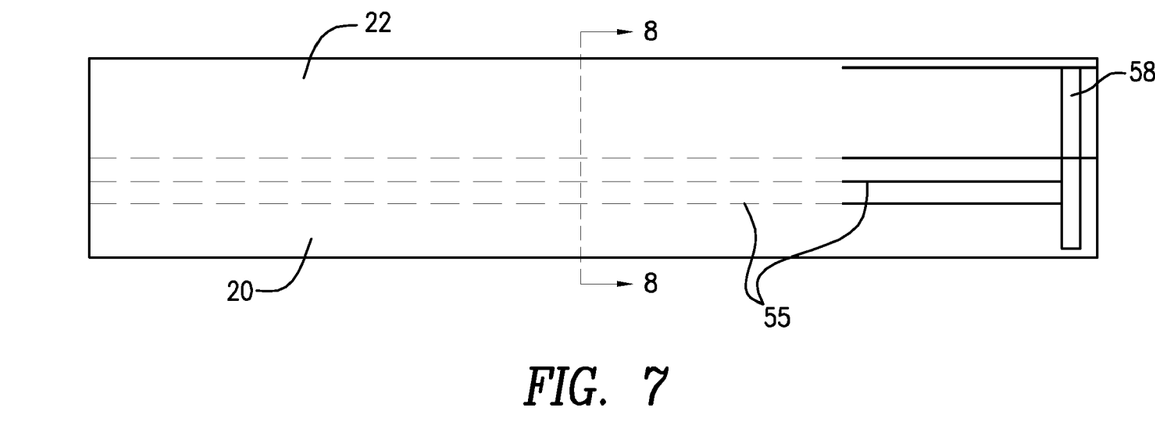
FIG. 7 is a side view of an alternative embodiment of the ship of the present invention, illustrating the multi-level, ladder-like structure.
Figure 8:
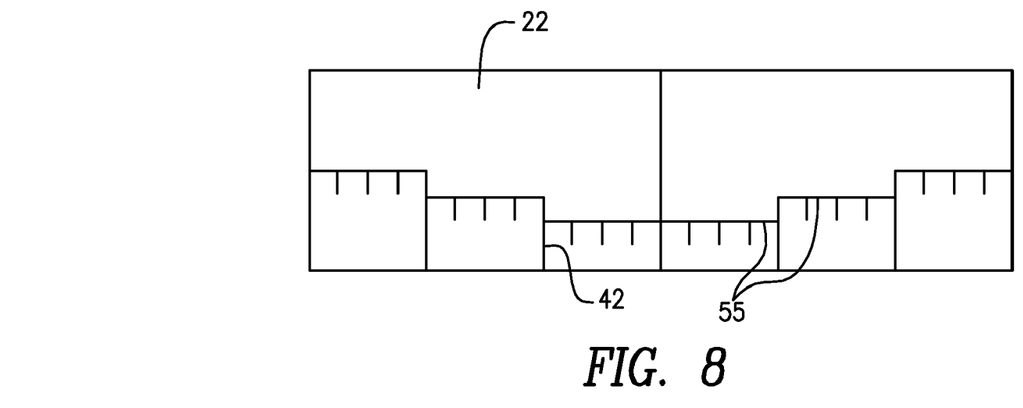
FIG. 8 is a transverse section taken on line 8-8 of the embodiment of FIG. 7.

In more complex embodiments anticipated by the present invention and illustrated on FIGS. 7 and 8, the ceiling 32 and/or the floor 30 the ceiling of the lower level has a multi-level ladder-like structure, with steps 55 built into it. Such multi-level ladder-like structure allows for additional rigidity of the lower level 20. Furthermore, it allows for a way of shaping the lower level 20 to fit on existing ship hulls that are not flat-bottomed.

The upper level 22, as discussed above, provides floatability to the ship 10. It is partially submerged and partially extends above the water. In the preferred embodiments, the left side 48 of the upper level 22 and the right side 50 of the upper level 22 converge to an edge-shaped bow 56. The edge-shaped bow refers to both sides coming to a mostly-vertical edge on the front of the ship 10. The bow 56, shown on the preferred embodiment of FIG. 1 is slightly concave to better redistribute the load/pressure from the oncoming flow of water.

In the preferred embodiments, the float 40 looks somewhat like a traditional vessel hull (although in other embodiments, the float can be of circular or other shape). In addition to providing floatability, float 40 may have utility compartments within, such as passenger rooms, sections, engine rooms, and other useful compartments. In fact, the invention anticipates that most varieties of the existing ship hulls, and particularly flat-bottomed hulls may be modified into an embodiment of ship 10 by combining such hulls with at least one (preferably one) lower level 20, turning the existing hull into upper level 22. That is, existing ships can be stabilized by attaching the lower level 20 to the bottom of the vessel's hulls. Moreover, ships with keels may be modified by removing the keel sections and installing the lower level 20 (with or without propellers in the level 20) instead. This will greatly increase the loading capacity of such vessels, as the ballast of the keel will be removed, replaced by much lighter lower section 20. At the same time, hundreds or thousands tons of water always contained in the lower level 20 will provide more stability, without weighing the vessel down, than any internal ballast ever can.

Alternatively, the lower level can also be fitted to accommodate the presence of the keel. For example, two lower levels 20 may be fitted onto a ship with a keel, one on each side of the pre-existing keel.

Preferably the float 40 and the lower level 20 are of the same or similar width throughout most of the length of the ship 10. However, in some variants, the lower level 20 may be much narrower or wider than the float. FIG. 1 shows a preferred embodiment, where the lower level 20 is of the same or similar width as the float 40 throughout some of the length of the ship, but is broader than the float 40 in the bow end 12 of the ship 10.

It is also foreseeable that height of the lower level 20 may be adjustable via the telescopic extendable sidewalls 24 and/or telescopic bulkheads 42. In general, the greater is the height of the lower level 20, the more water it holds, and the more stability it provides. Thus, it may be benefical to increase the height of the lower level 20 in rough seas or to improve stability of the non-moving ship (particularly in situations where anchoring is not practicable). When the seas are calm, it may be beneficial to reduce the height of the lower level 20 to reduce drag as much as possible. In some non-preferred embodiments, the lower level 20 is fully retractable into the float 40 for sailing in calm or very shallow waters, for example.

In order to increase maneuverability, the preferred embodiment of the ship 10 further comprises at least one, and preferably several front rudders 58. These front rudders 58 are positioned in the bow end 12 of the ship body. These rudders 58 may be used instead of or in conjunction with the rudders located in the stern end 14 of the ship 10. In the preferred embodiment on FIG. 1, there are two rudders 58, installed in a frame on two opposite sides (the left side and the right side) of the bow 56. In the embodiment of FIG. 6, there are two more rudders 56 installed in the side walls 24.

The water flow, redirected by the rudders 58 of the upper level and displaced by the bow of the float 40, preferably escapes to the sides of the ship 10. To achieve this effect, the upper level 22 comprises a plurality of water outlets 60 in the bow end of the ship. Water outlets 60 refer to the openings in vertical structures of the ship 10. These water outlets 60, are preferably positioned behind the rudders, on each side of the bow 56, as shown in FIG. 1. In other embodiments, where the rudders are installed in the lower level or extend from the upper level to the lower level, the lower level may also comprise water outlets 60 to allow the water, diverted by the rudders to escape to the side of the ship 10.

Figure 3:
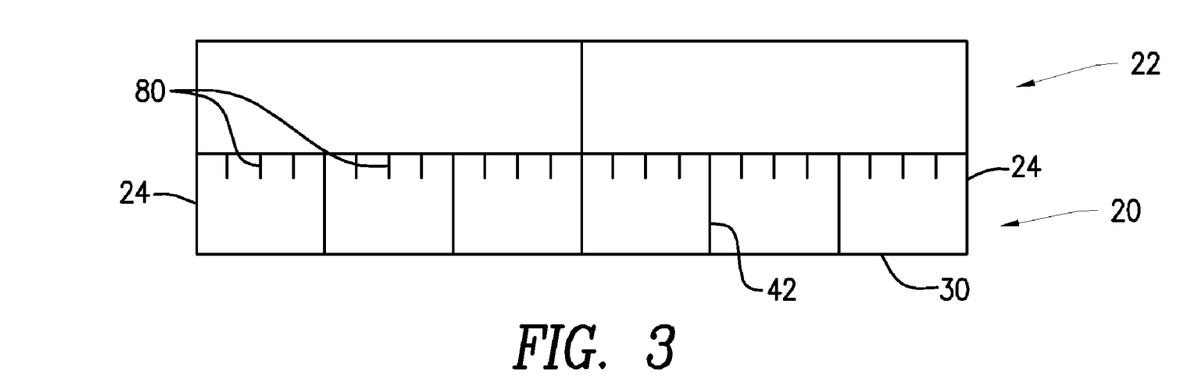
FIG. 3 is a transverse section taken on line 3-3 of the ship of FIG. 2, showing the bulkheads and the bands.

In order to reduce the friction with water even further, the ceiling 32 of the lower level 20 further comprises a plurality of raised bands 80, as shown on FIG. 3. The bands 80 descend from the ceiling and extend (run) longitudinally for most of the length of the lower section 20. In the preferred embodiments, the bands descend only a few centimeters down, but can extend longitudinally (horizontally, along the length of the ship 10) for many meters, and preferably, the entire length of the ship 10. The preferred embodiments of the ship 10 further comprise a gas pump. The gas pump may be a compressor or an exhaust pipe for channeling compressed air, engine exhaust, or other gas into spaces between the adjacent bands 80. As the ship 10 moves forward, gas bubbles trapped between the adjacent bands 80 travel along these bands under the ceiling 32. This gas, under the ceiling 32 creates a layer of lubrication between the water and the ceiling 32, virtually eliminating friction. The gas is preferably released from apertures located between the raised bands on the ceiling 32 in the bow end of the ship 10.

In other preferred embodiment, bands 80 also descend from the floor 30 of the lower section 20. The gas trapped between these bands, as discussed above will reduce the friction of the ship 10. Gas may also be directed from below at vertical surfaces in the bow end 12 of the ship 10 to reduce friction with water even further.

Naturally, to minimize the frontal resistance of the water, the thickeness of the tunnel walls and the bulkheads in the bow end 12 of the ship 10 must be minimal. Preferably, all walls and bulkheads narrow to a sharp edge (although not necessarily cutting-sharp) in the bow end 12. With sharp front edges, the lower level 20 will cut through water as a sharp knife, improving efficiency by channeling the water to the propeller, and providing the stability of thousands tons of ballast, without weighing the ship down.

It is to be understood that while the apparatus and method of this invention have been described and illustrated in detail, the above-described embodiments are simply illustrative of the principles of the invention and the forms that the invention can take, and not a definition of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

I claim:

1. A ship body, comprising:
   a bow end, a stern end, a right side, a left side,
   a length of the ship body and a width of the ship body,
   a lower level, said lower level intended to be submerged under water, and an upper level, wherein
   a. the lower level comprises:
   i. at least two parallel walls, the at least two parallel walls comprising a left wall and a right wall, said left wall located on the left side of the ship body, and said right wall located on the right side of the ship body;
   ii. a floor, the floor connecting the at least two parallel walls, said floor horizontally extending from the left wall to the right wall and spanning the width of the ship body, said floor also spanning at least ⅔ of the length of the ship body;
   iii. a ceiling, connecting the at least two parallel essentially vertical walls,
   iv. a front end and a rear end, the front end being open to allow water to enter through the front end, and
   v. a tunnel, the tunnel extending longitudinally inside of the lower level, extending from the front end to the rear end, and wherein
   b. the upper level comprises a floatable body;
   c. the lower level further comprises at least three bulkheads inside of the tunnel, said at least three bulkheads extending vertically from the floor to the ceiling, and extending longitudinally inside the tunnel for more than half the length of the tunnel, thus dividing the tunnel into at least three parallel subsections;
   d. the tunnel has the same consistent cross-sectional diameter throughout the length of the tunnel;
   e. the left side of the upper level and the right side of the upper level converge to form an edge-shaped bow; and
   further comprising at least one front rudder, said at least one rudder positioned in the bow end of the ship body.

2. The ship body of claim 1, wherein the upper level comprises a plurality of water outlets in the bow end of the ship.

3. A ship body, comprising:
   a bow end, a stern end, a right side, a left side,
   a length of the ship body and a width of the ship body,
   a lower level, said lower level intended to be submerged under water, and an upper level, wherein
   a. the lower level comprises
   i. at least two parallel walls, the at least two parallel walls comprising a left wall and a right wall, said left wall located on the left side of the ship body, and said right wall located on the right side of the ship body;
   ii. a floor, the floor connecting the at least two parallel walls, said floor horizontally extending from the left wall to the right wall and spanning the width of the ship body, said floor also spanning at least ⅔ of the length of the ship body;
iii. a ceiling, connecting the at least two parallel essentially vertical walls,
iv. a front end and a rear end, the front end being open to allow water to enter through the front end, and
v. a tunnel, the tunnel extending longitudinally inside of the lower level, extending from the front end to the rear end, and wherein
b. the upper level comprises a floatable body;
c. the lower level further comprises at least three bulkheads inside of the tunnel, said at least three bulkheads extending vertically from the floor to the ceiling, and extending longitudinally inside the tunnel for more than half the length of the tunnel, thus dividing the tunnel into at least three parallel subsections;
d. wherein the ceiling of the lower level comprises a plurality of raised bands, said bands descending from the ceiling and extending longitudinally for most of the length of the lower section.

4. The ship body of claim 3, further comprising a gas pump, the gas pump intended for pumping bubbles of gas into spaces between adjacent bands of the plurality of raised bands.

5. A method of stabilizing a vessel hull, comprising the steps of
a. obtaining a flat-bottomed vessel hull;
b. obtaining a lower level, said lower level intended to be submerged under water, the lower level comprising:
i. at least two parallel walls, the at least two parallel walls comprising a left wall and a right wall,
said left wall located on the left side of the ship body, and said right wall located on the right side of the ship body;
ii. a horizontal floor, connecting the at least two parallel walls,
said floor horizontally extending from the left wall to the right wall and spanning the width of the ship body,
said floor also spanning at least ⅔ of the length of the ship body;
iii. a horizontal ceiling, connecting the at least two parallel essentially vertical walls,
iv. a front end and a rear end, the front end and the rear end both being open to allow water to enter through the front end, and exit via the rear end,
v. a tunnel, the tunnel extending longitudinally inside of the lower level, extending from the front end to the rear end;
c. attaching the lower level to the bottom of the vessel hull;
wherein the horizontal ceiling of the lower level has a multi-level ladder structure.

6. A ship body, comprising:
a bow end, a stern end, a right side, a left side,
a length of the ship body and a width of the ship body,
a lower level, said lower level intended to be submerged under water, and an upper level, wherein
a. the lower level comprises
i. at least two parallel walls, the at least two parallel walls comprising a left wall and a right wall,
said left wall located on the left side of the ship body, and said right wall located on the right side of the ship body;
ii. a floor, the floor connecting the at least two parallel walls, said floor horizontally extending from the left wall to the right wall and spanning the width of the ship body, said floor also spanning at least ⅔ of the length of the ship body;
iii. a ceiling, connecting the at least two parallel essentially vertical walls,
iv. a front end and a rear end, the front end being open to allow water to enter through the front end, and
v. a tunnel, the tunnel extending longitudinally inside of the lower level, extending from the front end to the rear end, and wherein
b. the upper level comprises a floatable body;
c. the ship body further comprising a plurality of raised bands, said raised bands descending from the ceiling and running longitudinally for at least half of the length of the lower level.

7. The ship body of claim 6, further comprising:
a. band spaces, said band spaces formed between adjacent bands;
b. a gas pump, said gas pump intended for channeling compressed gas into the band spaces to create a lubrication layer.

8. A ship body, comprising:
a bow end, a stern end, a right side, a left side,
a length of the ship body and a width of the ship body,
a lower level, said lower level intended to be submerged under water, and an upper level, wherein
a. the lower level comprises
i. at least two parallel walls, the at least two parallel walls comprising a left wall and a right wall,
said left wall located on the left side of the ship body, and said right wall located on the right side of the ship body;
ii. a floor, the floor connecting the at least two parallel walls, said floor horizontally extending from the left wall to the right wall and spanning the width of the ship body,
said floor also spanning at least ⅔ of the length of the ship body;
iii. a ceiling, connecting the at least two parallel essentially vertical walls,
iv. a front end and a rear end, the front end being open to allow water to enter through the front end, and
v. a tunnel, the tunnel extending longitudinally inside of the lower level, extending from the front end to the rear end, and wherein
b. the upper level comprises a floatable body;
c. the lower level further comprises at least three bulkheads inside of the tunnel, said at least three bulkheads extending vertically from the floor to the ceiling, and extending longitudinally inside the tunnel for more than half the length of the tunnel, thus dividing the tunnel into at least three parallel subsections;
d. the tunnel has the same consistent cross-sectional diameter throughout the length of the tunnel;
e. the left side of the upper level and the right side of the upper level converge to form an edge-shaped bow; and
further comprising a plurality of front rudders, said plurality of front rudders positioned in the bow end of the ship body.

* * * * *